US008223352B2

(12) United States Patent
Roof

(10) Patent No.: US 8,223,352 B2
(45) Date of Patent: Jul. 17, 2012

(54) METHOD FOR SCHEDULING TRANSIENT DOCUMENT ERASE CYCLE

(75) Inventor: Bryan J. Roof, Newark, NY (US)

(73) Assignee: Xerox Corporation, Norwalk, CT (US)

( * ) Notice: Subject to any disclaimer, the term of this patent is extended or adjusted under 35 U.S.C. 154(b) by 688 days.

(21) Appl. No.: 12/404,482

(22) Filed: Mar. 16, 2009

(65) Prior Publication Data

US 2010/0233597 A1 Sep. 16, 2010

(51) Int. Cl.
*G06K 15/00* (2006.01)
*G03C 11/00* (2006.01)

(52) U.S. Cl. ........................................ 358/1.12; 430/19

(58) Field of Classification Search ................ 358/1.12; 430/19
See application file for complete search history.

(56) References Cited

U.S. PATENT DOCUMENTS

| | | | | |
|---|---|---|---|---|
| 7,229,740 B2 * | 6/2007 | Iftime et al. | ............... | 430/270.1 |
| 2004/0169713 A1 * | 9/2004 | Niino et al. | ................... | 347/171 |
| 2006/0285147 A1 * | 12/2006 | Wolfman et al. | ............ | 358/1.14 |
| 2010/0045771 A1 * | 2/2010 | Arai et al. | ..................... | 347/262 |

OTHER PUBLICATIONS

Bryan J. Roof, "Infrared Heat Source Tied to Image Scanner for Transitional Document Erasing", US Patent Application filed concurrently herewith, (Mar. 16, 2009).

Gabriel Iftime et al, "Inkless Reimageable Printing Paper and Method", U.S. Appl. No. 12/206,136, filed Sep. 8, 2008.

* cited by examiner

*Primary Examiner* — Twyler Haskins
*Assistant Examiner* — Fred Guillermety
(74) *Attorney, Agent, or Firm* — MH2 Technology Law Group LLP

(57) ABSTRACT

A method of handling documents which can be imaged and erased comprises entry of a scheduled time which a device such as a multipurpose imager and eraser has a low probability of being used. At the scheduled time, erasure of transient documents to be erased is initiated. A transient document to be erased is transported from a first transient document storage area to an erasure area where it is erased, then transported to a second, erased transient document storage area. Upon receipt of a user interrupt during the scheduled erasure, any partially erased transient document is returned to the first transient document storage area for later erasure. The method thus allows for more efficient use of equipment resources, for example in an office environment.

10 Claims, 5 Drawing Sheets

METHOD FOR SCHEDULING TRANSIENT DOCUMENT ERASE CYCLE

FIELD OF THE INVENTION

This invention relates to the field of printing and imaging devices, and more particularly to a method for imaging information onto a print medium, and for erasing previously imaged information from a print medium.

BACKGROUND OF THE INVENTION

Printing devices such as computer printers, photocopiers, etc. which place information onto one or more print media are well established. Less established are devices which print an erasable image onto a print medium. Various marking formulations have been used which provide an image which can be easily erased, requiring an exposure to heat and visible light for a period of less than 10 seconds to effect a complete image erasure. However, these formulations have the drawback of fading over a period of three days or so when exposed to ambient light. Other erasable image marking formulations print a more permanent image and have a lifetime of weeks to months, but have the drawback of being difficult to erase, requiring about two minutes for complete erasure, which is generally considered excessively long for most uses.

An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference. An embodiment of the chemical formulation detailed in the co-pending application comprises a photochromic material, for example an alkoxy modified dithienylethene. Use of this material allows for the imaging of a pattern onto the medium using patterned ultraviolet (UV) light. In use, the print medium is coated with the chemical formulation which is then cured and exposed to a patterned UV light source, such as from a light emitting diode (LED). The UV light chemically alters the formulation to produce a visible image pattern. The image is reasonably stable and remains visible for a longer period of time when exposed to ambient light than conventional erasable inks, for example weeks to months, but is erasable on demand using one or more of visible light and heat. The chemical formulation is reprintable such that the same or a different pattern can be printed using a UV light pattern. The formulation comprises the use of an infrared-absorbing dye additive which heats faster than conventional dyes and thus effects complete erasure in a shorter period of time.

With the advent of a rewritable printing formulation which overcomes the competing problems of image longevity versus erasure difficulty found with conventional erasable image printing processes, other problems related to printing and erasing the chemical formulation onto a print medium can be addressed.

SUMMARY OF THE EMBODIMENTS

According to various embodiments, a method of handling a transient document is provided. The method can comprise receiving an erase sequence start time, monitoring a time for the sequence start time, and at or after the erase sequence start time, initiating a transient document erase sequence. The transient document erase sequence can comprise transferring a transient document comprising an erasable imaged pattern from a first storage area to an erasure area, and erasing the erasable imaged pattern from the transient document to provide an erased transient document. The erased transient document can be transferred to a second storage area.

According to various other embodiments, a method of handling a plurality of transient documents using a multipurpose device which provides at least a first functionality and a second, erasure functionality is provided. The method can comprise placing the plurality of transient documents to be erased into a first storage tray, entering an erase sequence start time and, prior to reaching the sequence start time, placing the multipurpose device into a first mode to provide the first functionality. A time is monitored for the erase sequence start time. At or after the erase sequence start time, the multipurpose device can be placed into a second mode to perform the second, erasure functionality which initiates the erase sequence. The erase sequence can comprise transferring a transient document comprising an erasable imaged pattern from a first storage area to an erasure area, and erasing the erasable imaged pattern from the transient document to provide an erased transient document. Additionally, the erased transient document can be transferred to a second storage area.

Another embodiment comprises a computer readable medium storage medium, the computer readable storage medium storing instructions for causing a processor to perform a method of handling a plurality of transient documents using a multipurpose device which provides at least a first functionality and a second, erasure functionality. The method can comprise receiving an erase sequence start time, monitoring a time for the sequence start time, and at or after the erase sequence start time, initiating a transient document erase sequence. The transient document erase sequence can comprise transferring a transient document comprising an erasable imaged pattern from a first storage area to an erasure area, and erasing the erasable imaged pattern from the transient document to provide an erased transient document. The erased transient document can be transferred to a second storage area.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

It should be noted that some details of the FIGS. have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts.

While discussed in more detail below, various embodiments of the present method comprise an automatic document erase cycle which is initiated and completed during one or more periods of time when a multipurpose device, such as a document printer/scanner/eraser, has a low probability of being used. An erase cycle to erase an image from a photochromic material can require an excessively long time, longer than is required for a scan or print cycle. Thus it is contemplated that performing the erase cycle automatically during off hours, such as non-business hours, would result in increased availability of office equipment. A user can input information regarding one (or more) times when the device is likely to be unused. The multipurpose device automatically monitors the time and, upon reaching the specified time, initiates a document erase cycle. During the erase cycle, if a user interrupt is received, the erase cycle stops or is delayed, any document being erased is returned to a "to be erased" tray for later erasure, and the multipurpose device is returned to a regular print mode. If no user interrupt is detected and the "to be erased tray" is populated, each sheet is erased in turn and, when erased, is transported to an erased page storage area.

Figure 1:
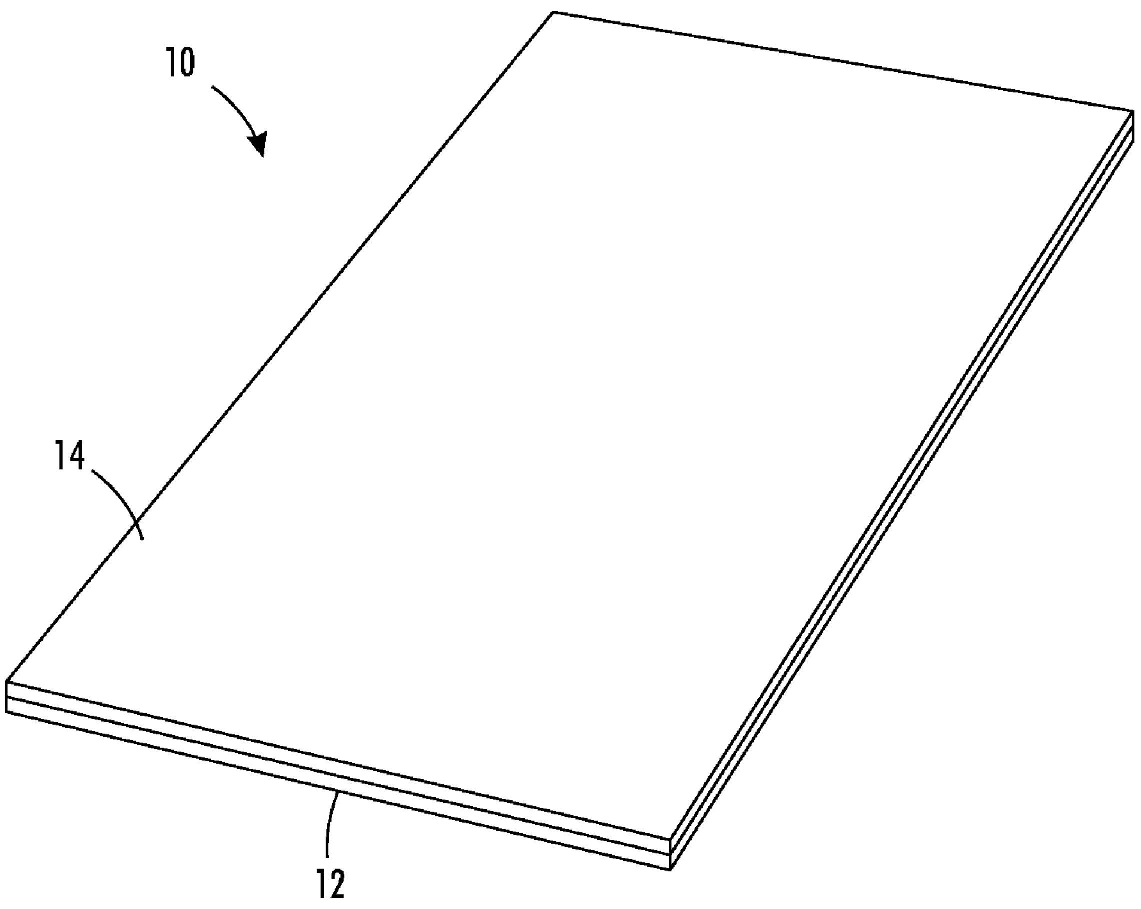
FIG. 1 is a perspective depiction of a transient document having a photochromic coating which allows for writing an image in the coating on the page and for erasing an image from the coating.

FIG. 1 depicts a print medium 10 such as a paper sheet 12 coated, for example, with the reprintable chemical formulation 14 which is the subject of U.S. patent Ser. No. 12/206,136 as discussed above. The chemical formulation can provide a long lasting image which can be erased in a shorter time than conventional inks. Printing of an image onto the entire sheet can be performed in one exposure by passing the light through a mask or reticle pattern using a lens system or the image can be written or printed serially using a light pen, for example one which comprises the use of a computer-controlled UV laser. Erasing of the image can be performed using a single exposure one or more of visible light, heat, and IR radiation, although other erasing techniques are contemplated. For simplicity, the embodiments of the invention discussed below refer to erasure through heat supplied by IR radiation exposure, but it will be understood that other or additional erasing techniques are also contemplated and within purview of various embodiments.

Handling of the coated media (also referred to herein as a "transient document" because of the transient nature of the image printed thereon) is required to expose the coating to UV light to print an image on the medium, and to expose the printed medium to IR radiation to effect erasure of the printed image. A printing apparatus which exposes the formulation-coated medium to UV light to print the image and a separate erasing apparatus which exposes the formulation to IR radiation to erase the image can be effectively used during processing of the print medium.

A multi-purpose device which, in one embodiment, prints an image onto the coating, erases an image, and copies a document is the subject of co-pending application titled "Infrared Heat Source Tied to Image Scanner for Transitional Document Erasing," which is commonly assigned to Xerox Corp., filed concurrently herewith, and incorporated by reference in its entirety herein.

Figure 2:
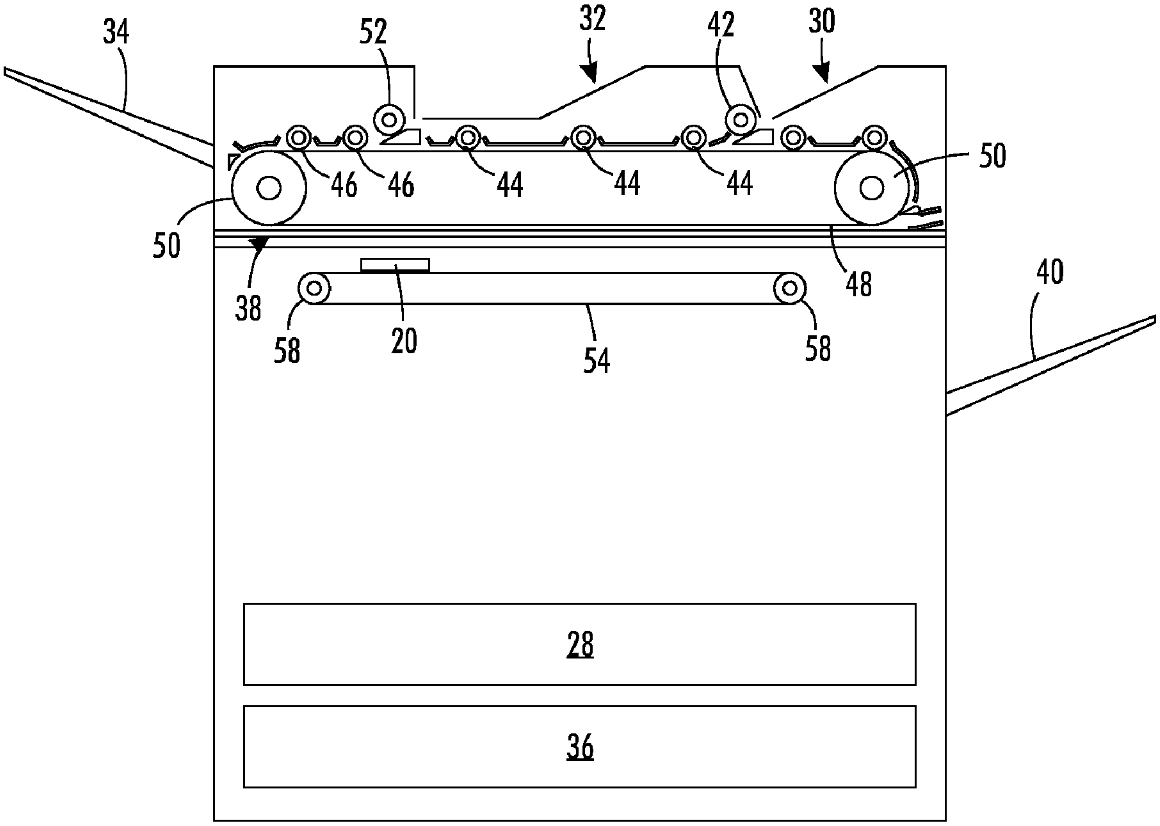
FIG. 2 is a cross section depicting an embodiment of a device for handling one or more pages such as that depicted in FIG. 1.
Figure 3:
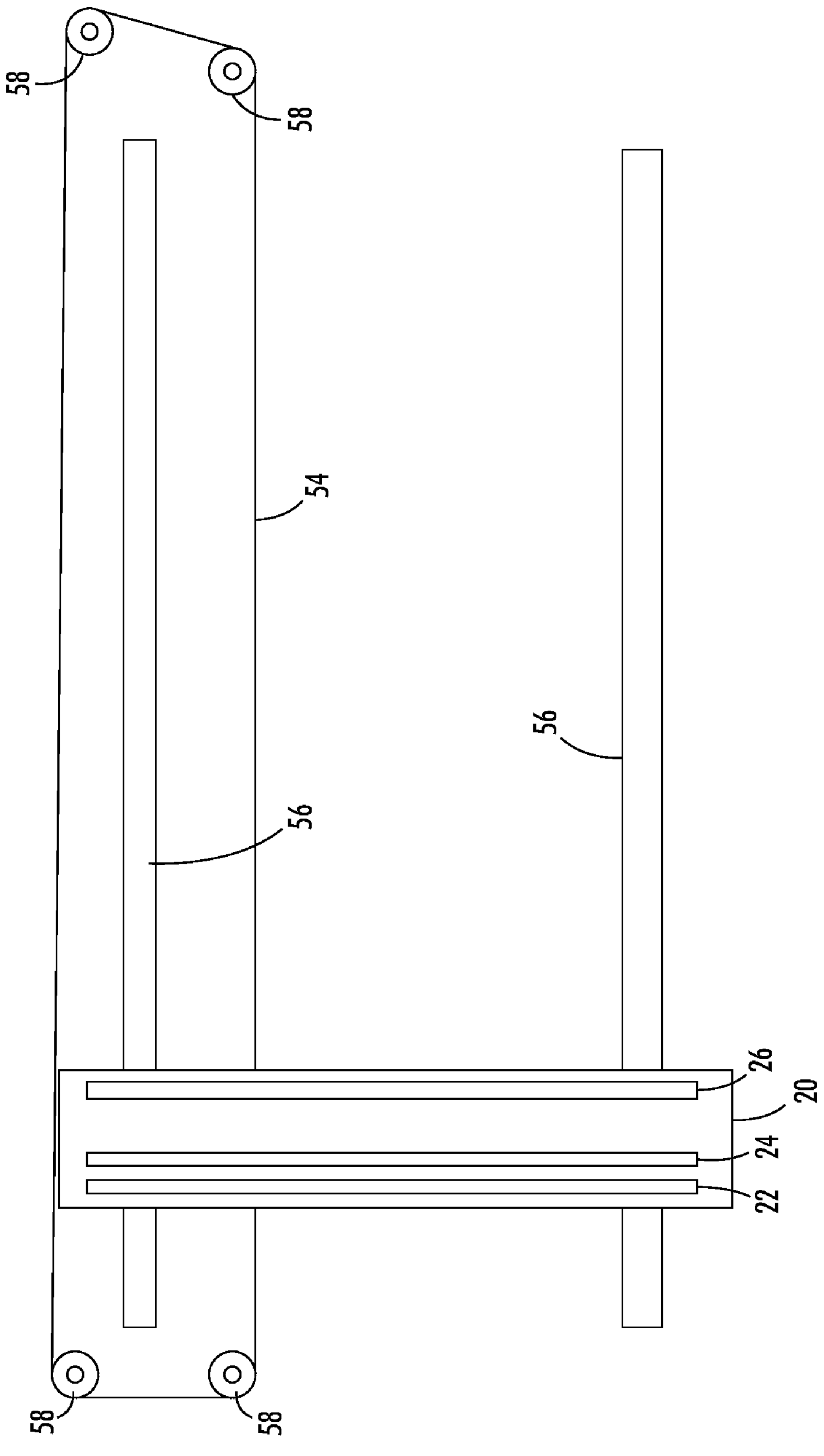
FIG. 3 is a plan view of a scan head and drive assembly of a device of the FIG. 2 structure.

FIGS. 2 and 3 depict an exemplary embodiment of a multipurpose device. A multipurpose device is preferable over a single-use device, for example to decrease equipment costs and to minimize space requirements. In an embodiment, the device can comprise a printing source such as a UV light source for imaging a pattern onto the chemically coated sheet. The device can further comprise an erasing source, such as at least one of a visible light source and heat supplied through an IR light source such as a quartz bulb (quartz halogen heater). The device can also use a third light source having a wavelength which does not image or erase the photochromic material in order to scan a preprinted document. The device can then store the copied document in electronic form, email the electronic copy of the electronic document, and/or use the printing source to print a copy of the document. Another possible function comprises use as an integrated fax machine.

While a complete description of the device embodiments can be found in the incorporated application titled "Infrared Heat Source Tied to Image Scanner for Transitional Document Erasing," the device of FIGS. 2 and 3 can comprise the following elements: scan head 20 comprising a scanning light source 22, scanner imager photodetector 24, and an erasing light source 26; feed trays 28, 36; "to be copied" tray 30 and a "to be erased" tray 32; erased sheet output tray 34; glass or quartz scanning window 38; printed page output tray 40; "to be copied" page pickup roller 42; automatic document feeder (ADF) rollers 44, 46; drive belt 48 and rollers 50; "to be erased" sheet pickup roller 52; and scan head drive belt 54, slide rails 56, and drive belt rollers 58.

In various embodiments, erasure of printed materials using the multipurpose equipment such as that discussed in the co-pending application might be best performed during periods when the multipurpose equipment is not being otherwise used. This would allow for uninterrupted use of the equipment for image scanning and/or exposure. A method is thus provided for an erasure process which automatically erases the printed document during periods when the multipurpose equipment is otherwise unused, and can return the erased sheet to a printing tray or an "erased tray" for reuse.

Figure 4:
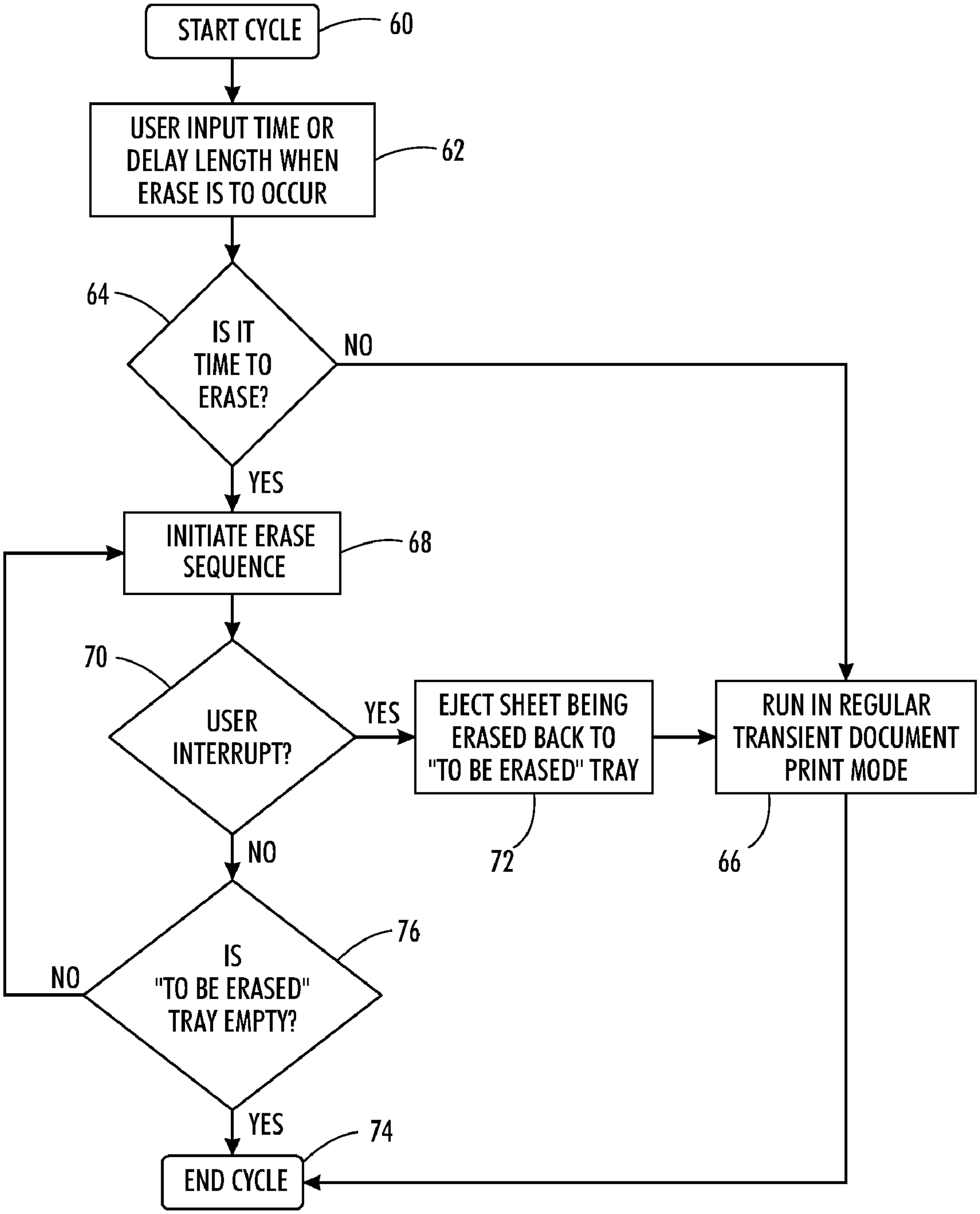
FIG. 4 is a first embodiment for erasing documents during scheduled periods of time.

A first embodiment of an automatic erase cycle for erasing one or more print medium (hereinafter "pages") using a multipurpose printer/eraser during periods of low device use is depicted at FIG. 4. The automatic erase cycle starts 60 and a user can input 62 (schedule) a specific time of day that the automatic erase cycle is to start, or a range of time that the automatic erase function is to be enabled. It will be appreciated that more than one start time or more than one time range can be input. In another embodiment, the user could enter a specific delay length from time of last use of the equipment, such that the erase cycle is initiated after a specified period of equipment inactivity. In any case, the time of day or time of delay is automatically monitored 64, and the equipment continues to run in transient document print mode 66 until the specified time or delay occurs.

Once the specified time or delay length occurs, the erase sequence mode is initiated 68 and a sheet is removed from a "to be erased" tray and erasure of the sheet is started.

If a user interrupts the erase sequence 70 during erasing, any sheet being erased is ejected back to a "to be erased" tray (an "erase tray") 72, and the equipment continues to run in regular transient document print mode 66 and the cycle ends 74. It should be noted that "End Cycle" 74 refers to the current cycle, and the sequence can be started again after a period of disuse or at the next scheduled start time or delay.

Once erasure of a sheet is completed, the "to be erased tray" is checked to see whether it is empty 76. If the tray contains unerased sheets, the erase sequence is again initiated 68.

Figure 5:
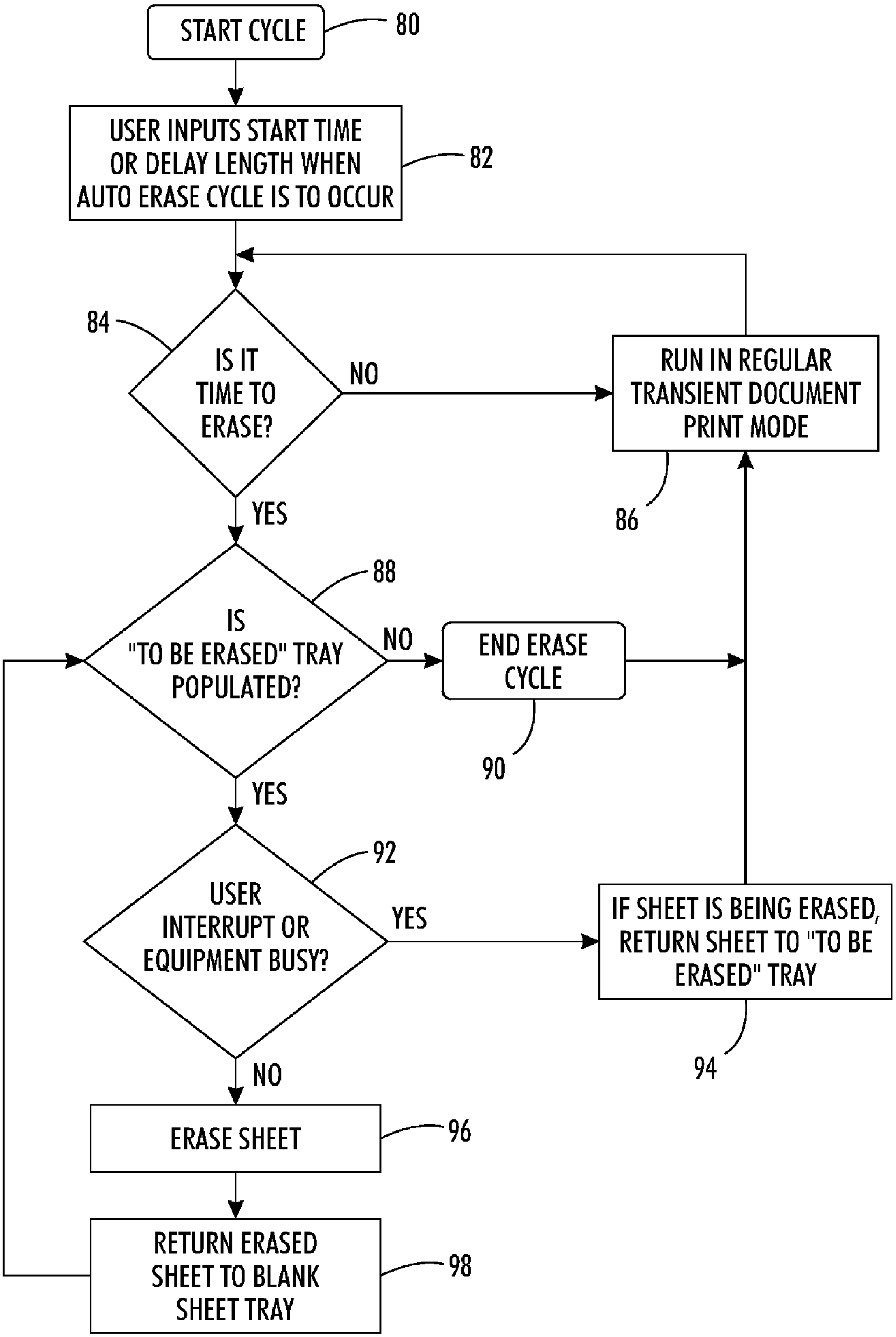
FIG. 5 is a second embodiment for erasing documents during scheduled periods of time.

Variations and embodiments of the method are contemplated, with another embodiment being depicted in FIG. 5. In this embodiment, the cycle starts 80 and the user can input a start time for the erase sequence 82, or a delay from the time of last equipment use. Start time is automatically monitored 84, with the device running in regular print mode 86 prior to reaching the start time. Once it is determined that the start time has been reached, the "to be erased tray" is checked to see whether it is populated 88. If the "to be erased tray" is not populated, the erase cycle is ended 90 and the device returns to regular print mode 86 until the next erase start time is reached 84.

Once the "to be erased tray" is checked 88 and is populated, it is determined whether the device is in use or a user has otherwise interrupted the erase cycle 92. If a the equipment is in use or a user interrupt is received, any sheet being erased is returned to the "to be erased" tray 92, and the device returns to regular print mode 86. If no user interrupt is detected, the ADF moves a sheet to the erase light source where it is erased 96. Once erased, the blank sheet is moved to a "blank sheet tray" 98 for immediate reuse, or to another blank page storage area. The "to be erased" tray is again checked to see if it is populated 88, and the cycle begins again. Once all sheets have been erased and the tray is no longer populated, the erase cycle ends 90 and the device returns to regular print mode 86 until the next erase cycle start time 84.

Thus various embodiments of the present invention conveniently manage transient documents to expose them to the necessary wavelengths of light which can be implemented in a computer readable storage medium containing instruction for causing a processor to perform a method of handling a plurality of transient documents. The computer readable storage medium can be stored in memory which is part of the multipurpose device print engine, or the multipurpose device can be controlled by a computer or microprocessor which is part of a larger network of devices, such as a plurality of office devices, printing devices, etc. Various embodiments can accomplish erasing of transient documents at noncritical times, for example during off hours to improve efficiency of equipment use and productivity, for example in an office setting.

A multipurpose device comprising one or more embodiments of the invention can include a separate tray/divider for storing transient documents that are no longer needed and are ready for erasure, a separate erase mode which turns on the erasure source (such as a light source and/or a heater) and loads documents for exposure, and an output tray/divider for storing erased sheets ready to be loaded into trays and written to. It is also contemplated that erased sheets can be loaded directly into a tray for direct feeding during printing. The multipurpose device can also include an auto-erase mode such that at a predetermined time for example 2:00 am., the sheets are fed from the "to be erased" tray and are automatically erased.

In the case where heat alone or heat in combination with visible light is used for erasure, it is further contemplated that thermal insulation of the automatic document feeder would minimize energy loss, particularly if an erase cycle of the photochromic material is excessively long.

A button-activated user interrupt mode can also be provided in the case where use of the multipurpose device during an erase cycle is desirable. A different button, or a interrupt/resume toggle, can be used to return the device to an interrupted erase cycle.

To better handle a user interrupt during a transient document erase cycle, a path to allow for return of an aborted erase sheet to the "to be erased" tray can be used. This would prevent the user from having to wait for complete erasure of a transient document if interruption of the erase cycle is desired.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take oh negative values. In this case, the example value of range stated as "less that 10" can assume negative values, e.g. −1, −2, −3, −10, −20, −30, etc.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising," The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of handling a transient document, comprising:
receiving an erase sequence start time;
monitoring a time for the sequence start time; and
at or after the erase sequence start time, initiating a transient document erase sequence comprising:
transferring a transient document comprising an erasable imaged pattern from a first storage area to an erasure area;
erasing the erasable imaged pattern from the transient document to provide an erased transient document;
during the erasing of the erasable imaged pattern from the transient document, receiving a user interrupt, such that the erasable imaged pattern is only partially erased;
returning the transient document comprising the partially erased image pattern to the first storage area;
transferring the transient document comprising the partially erased image pattern from the first storage area to the erasure area;
fully erasing the erasable imaged pattern from the transient document; and
transferring the erased transient document to a second storage area.

2. The method of claim 1, wherein:

transferring the transient document from the first storage area comprises removing the transient document from a paper tray which receives transient documents to be erased; and transferring the erased transient document to the second storage area comprises placing the erased transient document into a paper tray for receiving paper to be used for subsequent transient document imaging.

3. The method of claim 1, wherein:

transferring the transient document from the first storage area comprises removing the transient document from a first paper tray which receives transient documents to be erased;

transferring the erased transient document to the second storage area comprises placing the erased transient document into a second paper tray for storing erased transient documents; and the method further comprises transferring the erased transient document from the second storage area to a third storage area which comprises a paper tray for feeding paper to a transient document imaging device.

4. The method of claim 1, further comprising:

providing a transient document comprising a coating of a photochromic material;

exposing the coating to ultraviolet light to form the erasable imaged pattern; and exposing the coating to at least one of visible light, heat, and infrared radiation to erase the erasable image pattern.

5. A method of handling a plurality of transient documents using a multipurpose device which provides at least a first functionality and a second, erasure functionality, the method comprising:

placing the plurality of transient documents to be erased into a first storage tray;

entering an erase sequence start time;

prior to reaching the sequence start time, placing the multipurpose device into a first mode to provide the first functionality;

monitoring a time for the erase sequence start time;

at or after the erase sequence start time, placing the multipurpose device into a second mode to perform the second, erasure functionality which initiates an erase sequence comprising:

transferring a transient document comprising an erasable imaged pattern from a first storage area to an erasure area;

erasing the erasable imaged pattern from the transient document to provide an erased transient document;

during the erasing of the erasable imaged pattern from the transient document, receiving a user interrupt, such that the erasable imaged pattern is only partially erased;

after receiving the user interrupt, returning the transient document comprising the partially erased image pattern to the first storage area;

after receiving the user interrupt, placing the multipurpose device into the first mode to provide the first functionality;

transferring the transient document comprising the partially erased image from the first storage area to the erasure area;

fully erasing the erasable imaged pattern from the transient document; and transferring the erased transient document to a second storage area.

6. The method of claim 5, wherein:

transferring the transient document from the first storage area comprises removing the transient document from a paper tray which receives transient documents to be erased; and transferring the erased transient document to the second storage area comprises placing the erased transient document into a paper tray for receiving paper to be used for subsequent transient document imaging.

7. A computer readable storage medium, the computer readable storage medium storing instructions for causing a processor to perform a method of handling a plurality of transient documents using a multipurpose device which provides at least a first functionality and a second, erasure functionality, the method comprising:

monitoring a time for an erase sequence start time; and at or after the erase sequence start time, initiating a transient document erase sequence comprising:

transferring a transient document comprising an erasable imaged pattern from a first storage area to an erasure area;

erasing the erasable imaged pattern from the transient document to provide an erased transient document;

during the erasing of the erasable imaged pattern from the transient document, receiving a user interrupt, such that the erasable imaged pattern is only partially erased;

returning the transient document comprising the partially erased image pattern to the first storage area;

transferring the transient document comprising the partially erased image from the first storage area to the erasure area;

fully erasing the erasable imaged pattern from the transient document; and transferring the erased transient document to a second storage area.

8. The computer readable medium of claim 7, wherein:

transferring the transient document from the first storage area comprises removing the transient document from a paper tray which receives transient documents to be erased; and transferring the erased transient document to the second storage area comprises placing the erased transient document into a paper tray for receiving paper to be used for subsequent transient document imaging.

9. The computer readable medium of claim 7, wherein:

transferring the transient document from the first storage area comprises removing the transient document from a first paper tray which receives transient documents to be erased;

transferring the erased transient document to the second storage area comprises placing the erased transient document into a second paper tray for storing erased transient documents; and the method further comprises transferring the erased transient document from the second storage area to a third storage area which comprises a paper tray for feeding paper to a transient document imaging device.

10. The computer readable medium of claim 7, the method further comprising:

providing a transient document comprising a coating of a photochromic material;

exposing the coating to ultraviolet light to form the erasable imaged pattern; and exposing the coating to at least one of visible light, heat, and infrared radiation to erase the erasable image pattern.

* * * * *